United States Patent
Weber

(10) Patent No.: US 10,583,509 B2
(45) Date of Patent: Mar. 10, 2020

(54) WIRE ELECTRODE FOR THE SPARK-EROSIVE CUTTING OF ARTICLES

(75) Inventor: Paul Weber, Iserlohn (DE)

(73) Assignee: HEINRICH STAMM GMBH, Iserlohn (DE)

(*) Notice: Subject to any disclaimer, the term of this patent is extended or adjusted under 35 U.S.C. 154(b) by 1199 days.

(21) Appl. No.: 14/344,966

(22) PCT Filed: Sep. 16, 2011

(86) PCT No.: PCT/DE2011/001768
§ 371 (c)(1),
(2), (4) Date: Sep. 23, 2014

(87) PCT Pub. No.: WO2013/037336
PCT Pub. Date: Mar. 21, 2013

(65) Prior Publication Data
US 2015/0027991 A1    Jan. 29, 2015

(51) Int. Cl.
| | |
|---|---|
| *B23H 1/04* | (2006.01) |
| *B23H 1/06* | (2006.01) |
| *B21C 1/02* | (2006.01) |
| *C22C 9/04* | (2006.01) |
| *C22F 1/02* | (2006.01) |
| *C22F 1/08* | (2006.01) |

(52) U.S. Cl.
CPC ............... *B23H 1/04* (2013.01); *B21C 1/02* (2013.01); *B23H 1/06* (2013.01); *C22C 9/04* (2013.01); *C22F 1/02* (2013.01); *C22F 1/08* (2013.01)

(58) Field of Classification Search
CPC .... B21C 1/02; B23H 1/04; B23H 7/08; C22C 9/04; C22F 1/02

USPC ............................................ 219/69.15, 69.12
See application file for complete search history.

(56) References Cited

U.S. PATENT DOCUMENTS

| | | | | |
|---|---|---|---|---|
| 4,935,594 A | | 6/1990 | Groos et al. | |
| 5,762,726 A | * | 6/1998 | Barthel ................. | B23H 7/08 148/518 |
| 5,945,010 A | * | 8/1999 | Tomalin ................. | B23H 7/08 219/69.12 |
| 6,794,597 B2 | * | 9/2004 | Groos ................... | B23H 7/08 219/69.11 |

(Continued)

FOREIGN PATENT DOCUMENTS

| | | |
|---|---|---|
| DE | 19911095 | 9/2007 |
| EP | 1949995 | 7/2008 |

(Continued)

OTHER PUBLICATIONS

International Search Report issued by the European Patent Office in International Application PCT/DE2011/001768.

*Primary Examiner* — Michael G Hoang
(74) *Attorney, Agent, or Firm* — Henry M. Feiereisen LLC

(57) ABSTRACT

The invention relates to a wire electrode (10) for the spark-erosive cutting of articles, comprising and electrically conductive core (2) and a jacket (5) surrounding the core (2), which jacket comprises at least on α+β-cover layer (6) that contains β-brass and/or β'-brass. In order to provide a wire electrode that has improved cutting efficiency, according to the invention, the α+β-cover layer (6) forms a homogenous phase (7) of β-brass and/or β'-brass in α+β-brass grains (8) having an α+β-phase and/or a α+β'-phase are embedded.

8 Claims, 3 Drawing Sheets

(56) References Cited

U.S. PATENT DOCUMENTS

| | | | |
|---|---|---|---|
| 8,895,885 B2 * | 11/2014 | Nothe | B23H 7/08 219/69.12 |
| 2001/0050269 A1 | 12/2001 | Shimojima et al. | |
| 2003/0057189 A1 * | 3/2003 | Groos | B23H 7/08 219/69.12 |
| 2005/0040141 A1 | 2/2005 | Ly | |
| 2006/0219666 A1 * | 10/2006 | Shin | B23H 7/08 219/69.12 |
| 2008/0179296 A1 | 7/2008 | Ly et al. | |
| 2011/0290531 A1 | 12/2011 | Baumann | |

FOREIGN PATENT DOCUMENTS

| | | |
|---|---|---|
| EP | 2193867 | 12/2008 |
| JP | 2003039247 | 2/2003 |
| WO | WO 03/053621 | 7/2003 |

* cited by examiner

WIRE ELECTRODE FOR THE SPARK-EROSIVE CUTTING OF ARTICLES

CROSS-REFERENCES TO RELATED APPLICATIONS

This application is the U.S. National Stage of International Application No: PCT/DE2011/001768, filed Sep. 16, 2011, which designated the United States and has been published as International Publication No. WO 2013/037336 and for which priority is claimed pursuant to 35 U.S.C. 119(a)-(d) the description of which is hereby incorporated by reference.

BACKGROUND OF THE INVENTION

The invention refers to a wire electrode for the spark-erosive cutting of articles having an electrically conductive core and a jacket surrounding the core, which jacket comprises at least one $\alpha+\beta$ cover layer that contains $\beta$ brass and/or $\beta'$ brass and $\alpha+\beta$ brass and/or or $\alpha+\beta'$ brass.

The invention refers further to a method for the production of a wire electrode provided with a core outer layer from copper or $\alpha$ brass on which a zinc layer is deposited.

Such a wire electrode and method for production are known from EP 2 193 867 A 1. The wire electrode disclosed there is provided for the spark-erosive cutting of metallic work pieces. For processing, the wire electrode is subjected to a sufficiently high electric potential. On the other hand, the work piece normally is placed on ground potential. At the suitable proximity between the mechanically tensioned wire electrode and the work piece, a spark discharge occurs, thereby providing the desired cutting effect. Due to the spark discharge, material from the wire electrode is being constantly ablated from the wire. In order to prevent a complete wear-out of the wire electrode and thus tearing, during cutting or processing of the work piece, the wire is being continuously pulled through the cutting zone.

In order to improve the cutting performance of the wire electrode, EP 2 193 867 proposes to superpose several casing layers in radial direction, whereby the outer-most layer of the casing, which is directly facing the work piece, is made form a finely grained mixture of $\beta$ brass and/or $\beta'$ brass, and in addition $\gamma$-brass. The $\gamma$-phase supposedly serves to increase the discharge action in the processing crack and would thus provide a high cutting quality. The $\gamma$-brass would have to be integrated suitably strong into the outer casing layer, in order to realize high cutting performances. Due to the fine grain feature of the phases, a great number of grain sizes should be present that preferably serve the spark discharge. This supposedly improves the ignition capacity of the wire and thus especially the quality of the cut. The thickness of the casing layer is normally dependent of the dimensioning of the article to be cut. As the outer layer containing $\beta$- and $\gamma$-brass, at a certain thickness, has a detrimental effect on the conductivity and the tensile strength of the wire electrode, according to EP 2 193 867 an inner casing is provided consisting of $\beta$- and/or $\beta'$-brass and/or $\alpha+\beta$ brass and/or $\alpha+\beta'$ brass. The said phases are present next to each other in the inner casing layer as a coarse grained structure. Through this intermediate layer the total strength of the casing is increased and thus erosion resistance of the wire electrode raised.

From DE 199 11095 B4 a wire electrode is known that has a core of a copper/zinc alloy and a casing layer that envelops the core. The casing layer can be for example from brass, which is present in its $\alpha+\beta$-phase.

SUMMARY OF THE INVENTION

It is an object of the present invention to provide a wire electrode of the type as referred to in the introductory paragraph which has a fast cutting action and also of high quality.

Furthermore, it is an object of the present invention to provide a method as referred to in the introductory paragraph for producing such a wire electrode.

These objects are fulfilled starting from the wire electrode referred to in the introductory paragraph in that the $\alpha+\beta$-casing layer forms a homogenous phase from $\beta$ brass and/or $\beta'$ brass in which b $\alpha+\beta$-brass grains are embedded that are provided with an $\alpha+\beta$-phase and/or a $\alpha+\beta'$ phase.

Starting from the method as referred to in the introductory paragraph, the present invention solves the forgoing objects in that the starting wire that is provided with a zinc layer is being annealed stationed in a protective gas atmosphere over a holding time between 2 and 4 hours at annealing temperatures between 450° C. and 600° C. and subsequently drawn to its final diameter at a cooling rate between 60° C. and 80° C. per hour.

According to the present invention, is has been found that a wire electrode having a casing layer provided with a homogenous $\beta$ and/or $\beta'$ brass phase which has embedded brass grains with an $\alpha+\beta$-mixed phase, exhibits excellent cutting properties. Thus, the wire electrode according to the invention can be utilized for fast cutting actions. Generally, for such action the contour is prepared from the full material of the work piece whereby a high electric load is lead across the wire electrode. It has been shown, that the surfaces of the cut work pieces also exhibit a high quality according to requirements, such that additional revision cuts have become superfluous. In other words, even when carrying out an express cut, uneven cutting surfaces on the work piece in form of grooves and conical edges are avoided. Die $\alpha+\beta$-brass grains are held sufficiently tight in the homogenous $\beta/\beta'$-brass phase thereby realizing a sustainable ignitability at the spark discharge. At the same time, a sufficiently high cutting speed is generated which is most likely attributable to the homogenous $\beta$ and/or $\beta'$-brass phase. The $\alpha+\beta$ brass grains consist of brass which is present in its $\alpha+\beta$-mixed phase, whereby the zinc content of this phase varies preferably between 55 and 62 weight percent. Surprisingly, precisely this embedding of brass grains having that zinc portion that leads to the improved cutting properties.

The term embedding in the context of the present invention is to be understood that the $\alpha+\beta$-brass grains that are not facing the outer or inner surface of the $\alpha+\beta$-casing layer is entirely surrounded by the homogenous $\beta/\beta'$-brass. In a cross section view, the embedded $\alpha+\beta$-brass grains form islands that are surrounded entirely of a homogenous matrix of $\beta/\beta'$-brass. Only the $\alpha+\beta$-brass grains that define one of the surfaces of the $\alpha+\beta$-casing layer, are only partly surrounded by a homogenous brass matrix that is present in the $\beta$- and/or $\beta'$-brass phase.

Advantageously, the portion of the $\alpha+\beta$-brass grains in the $\alpha+\beta$-casing layer is between 10 weight percent and 30 weight percent. The portion of the $\alpha+\beta$-brass grains in this range results in especially advantageous cutting properties of the wire electrode according to the present invention. This refers not only to the quality of the cut concerning the surfaces of the cut work piece but also refers to the cutting speed.

Advantageously, the cross section of the wire electrode is essentially circular or rounded, wherein the α+β-brass grains are configured elongated and oriented predominantly in radial direction. The dimensioning of the α+β-brass grains can vary in grain size from a diameter or a length of a few microns to α+β-crystallites with a length in the range of 20 to 30 μm. Through the elongated structure and radial orientation of the α+β-brass grains, the cutting properties of the wire electrode during the entire eroding process remains essentially constant while the thickness of the casing is constantly decreasing. Moreover, this insures that the α+β-brass grains also project into the areas proximate the surface so that the positive cutting effect of the α+β-brass grains are able to develop at the start of the eroding process. While there is an even distribution of the α+β-brass grains in the α+β-casing layer this does not follow a predetermined principle.

According to a variant, the α+β-casing layer is the outermost casing layer. The casing can consist entirely, in other words, of only the said α+β-casing layer.

In a different variant, the casing is provided with a further γ-casing layer, which consists predominantly of γ-brass. With this additional γ-casing layer the quality of the cut, that is, for example depth and breadth of the cutting grooves resulting from cutting at the cut surface of the work piece, can be further reduced. To this end the γ-casing layer can consist entirely of γ-brass. In a respective preferred variant the γ-casing layer is the outermost casing layer.

Advantageously, the core of the wire electrode according to the present invention is at least in its outer, the core outer layer bordering the casing layer, of copper and/or brass. Copper- or α-brass exhibit excellent electrical conductivity and above all are soft and deformable thereby simplifying processing the wire. The wire is easier to wind, to stretch and to draw. Alternatively, if the copper of the core outer layer has been entirely used up during the production cycle of the wire electrode according to the invention, the core outer layer has no copper present.

Concerning the method according to the invention, a holding time of 3 hrs and an annealing temperature of 500° C. is advantageous. Wire electrodes produced according to these parameters provide the best cutting properties. Advantageously, the starting wire has a diameter between 0.5 and 1.5 mm, wherein the thickness of zinc layer varies between 1 and 20 μm.

Appropriately, the wire electrode, after having been drawn to a final diameter is subjected to a de-stressing heat treatment. The temperatures set for that purpose are below the temperatures that activate a measurable diffusion required for copper- and zinc particles.

The de-stressing annealing only improves the material properties of the respective wire electrode, so preferably a drawn hardened wire becomes a hard wire, with the tensile strength remaining constant, for example at 800 N/mm².

For the production of the γ-casing layer, the wire electrode is advantageously layered with a ductile zinc layer deposit and thereafter drawn to its final diameter with the subsequent annealing under a protective gas atmosphere. Annealing is for example carried out in a discharge annealing furnace at temperatures between 250° C. and 350° C. and a discharge speed between 0.4 and 1.5 m/s. Alternatively, annealing is carried out at a stationary temperature between 90° C. and 150° C. over a period from 2 to 20 hours. Within the framework of the present invention, the deposit of zinc, in principle, can be carried out any which way. In accordance with the present invention, various methods for depositing a zinc layer onto a wire can be utilized. For example the zinc layer can be deposited galvanically onto the α+β casing layer.

During the annealing process, copper is concentrated at the zinc layer, leading to the formation of brass which is present in the gamma-phase at the outer casing layer. During annealing in the discharge annealing furnace, which is for example configured in tubular shape into which a protective gas mixture is blown, preferably a mixture of $N_2H_2$, in opposing direction of the wire drawing action in order to avoid unwanted oxidation reactions. At the afore-stated speeds, at which the wire is drawn through the furnace, a residence time of the wire electrode in the heating section of the furnace is about 1 to 2 seconds. Heating- and cooling speed are respectively between 150° C. and 200° C. Due to the heat treatment, copper from the α+β-casing layer is forced into the casing layer with the subsequent build-up of the zinc layer with copper particles. The method conditions are selected in such a way that brass is formed in a gamma-phase having a zinc portion for example of about 65 weight percent. Since the wire after "conversion" of the casing layer into gamma brass is not longer drawn, a continuous outer casing layer of gamma brass is thus provided.

With the outer gamma layer, an even faster cutting action of preferably metallic work pieces can be realized.

Further advantageous embodiments and advantages of the present invention are subject to the following description of specific embodiments of the invention with reference to the figures of the drawing in which same numerals refer to same structures throughout, it is shown in,

DETAILED DESCRIPTION OF PREFERRED EMBODIMENTS

In the context of the present invention, the term α-brass means that the brass is present in its α-phase. This applies respectively to β-brass, β'-brass, α+β-brass, α+β'-brass and γ-brass.

Figure 1:
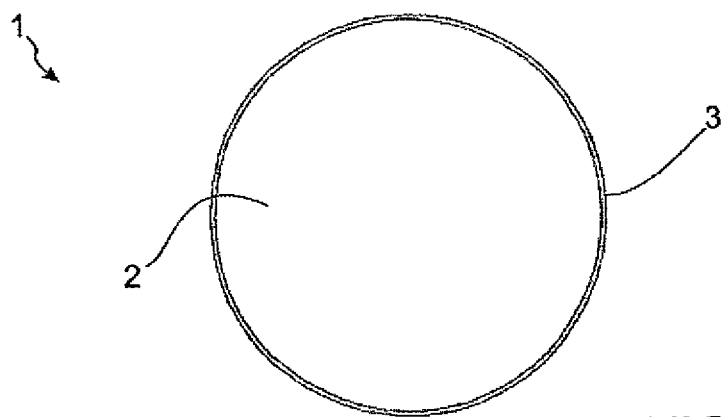
FIG. 1 an embodiment of a starting wire for the production of a wire electrode of the present invention in a schematic cross sectional view.

FIG. 1 shows an embodiment of a starting wire 1 in a schematic cross section, for the production of the wire electrode according to the present invention. The starting wire 1 shown has a core 2, which in this view consists entirely of α-brass with a zinc content of 36 weight percent. Alternatively, the core 2 can consist, for example, entirely of copper. It is also possible to utilize, a starting wire with a steel heart, wherein the steel of the steel heart is surrounded with a ring shaped core outer layer of copper or α-brass. In the cross sectional view as shown, core 2 has a circular shaped outer profile. The likewise circular starting wire is provided with a zinc layer 3 which completely surrounds the core 2. Within the framework of the present invention, the manner of depositing the zinc layer can principally vary. In the embodiment as shown the zinc layer was deposited galvanically onto core 2.

The core 2 has a diameter of about 1 mm. The thickness of the zinc layer varies advantageously between 10 µm and 20 µm. The so-produced starting wire was subsequently annealed at a holding time of 3 hours under nitrogen at a temperature of 500° C. The annealing was carried out in a so-called bell-type annealing furnace. The heat-up speed was 80-100° C. per hour. After the said holding time of 3 hours, the wire was cooled at a cooling speed between 60-80° C. per hour.

Figure 2:
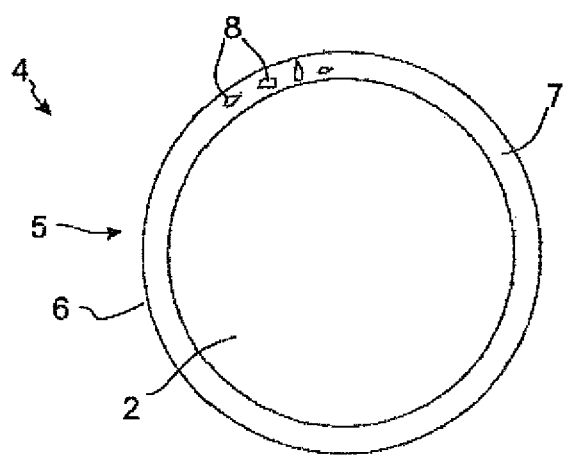
FIG. 2 the wire according to FIG. 1 after the stationary annealing under protective gas, also in a cross sectional view.

FIG. 2 depicts the wire electrode 4 obtained in this manner. The diameter is still about 1 mm. The core 2 of α-brass is surrounded by a casing 5 consisting of a single α+β-cover layer 6. The α+β-cover layer 6 contains homogenous β-brass and/or β'-brass 7, wherein in this homogenous β/β' brass phase 7, α+β-brass grains 8 that consist of brass with a α+β phase are embedded. The zinc content of the α+β-brass grains in the embodiment as shown are between 58 and 60 weight percent.

By means of the stationary annealing process according to the present invention, the copper particles diffuse from core 2 into the zinc layer 3, wherein simultaneously zinc particles migrate into the core 2. This leads to an increase in the layer thickness of the casing layer 6 to about 60 µm. The outer profile of core 2 shown in the cross sectional view in FIG. 2 remained essentially circular.

Figure 3:
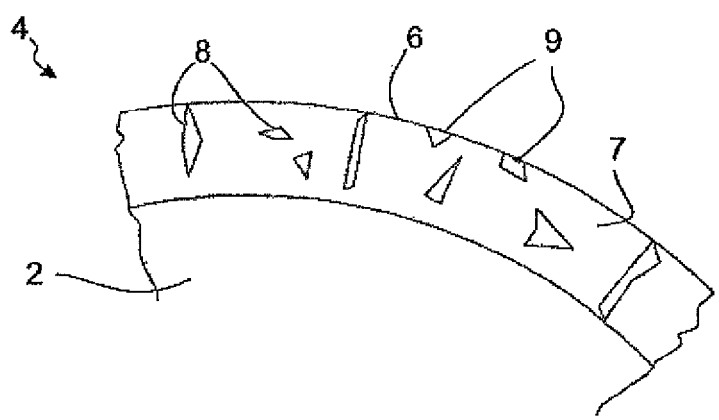
FIG. 3 a detail of the wire according to FIG. 2.

FIG. 3 shows an enlarged detail of wire electrode 4 according to FIG. 2. It is seen that the α+β-brass grains 8 are completely embedded into the homogenous brass phase 7 of β-brass and/or β'-brass. In other words, the α+β-brass grains 8 are completely surrounded by β-brass and/or β'-brass 7 or in other words embedded. Only α+β-brass grains 8 that are disposed at the outer or inner surface of the α+β cover layer 6 and co-border its surfaces, are surrounded only at the side facing said surface and not surrounded by β-brass and/or β'-brass 7.

Further shown in FIG. 3 are the α+β-brass grains 8 configured predominantly elongated thereby defining a longitudinal direction and wherein they are in the said longitudinal direction radially arranged, meaning from a cross sectional view from the center point of the core 2, they are oriented in a radiating pattern. This arrangement results in the elongated α+β-brass grains 8 projecting into the areas of the α+β-cover layer 6 that are close to the surface, and thereby ensures an even cutting capacity for the entire eroding process of the produced wire electrode. Smaller rounder α+β-brass grains 8 can be also seen, whose diameters are in the range of a few microns. The α+β-brass grains 8 are stochastic and evenly distributed within the α+β-cover layer.

Subsequently, the wire electrode 4 according to FIGS. 2 and 3 are drawn to their final diameter, for example, to 0.25 mm. Following is a heating process in form of a so-called de-stressing annealing process. The de-stressing is carried out at temperatures at which noticeable diffusion processes of copper and zinc are mostly excluded.

Figure 4:
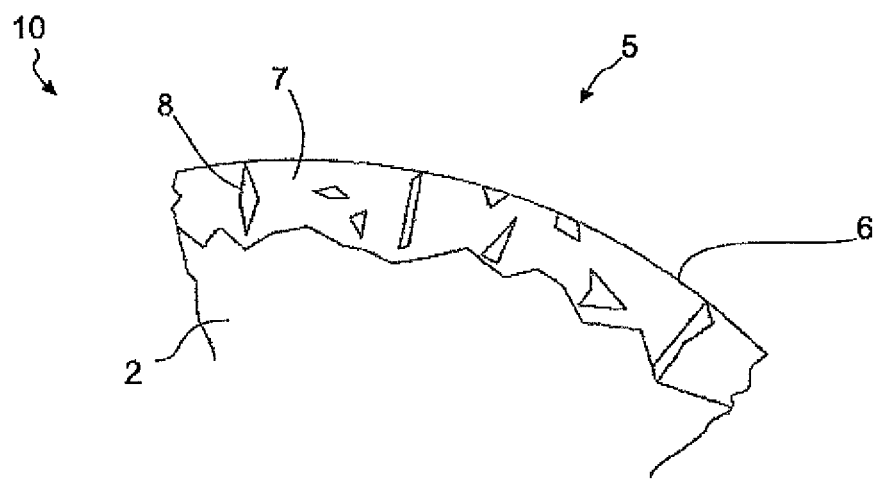
FIG. 4 an embodiment of the wire electrode according to the present invention in a view according to FIG. 3.

FIG. 4 shows such a wire electrode 10 drawn to its final diameter after the de-stressing annealing as a first embodiment of the wire electrode according to the present invention. The wire electrode 10 differs from the wire electrode 4 shown in FIGS. 2 and 3 in that the outer profile of the core 2 is no longer ideally circular. Due to the drawing action to the final diameter, the outer surface is somewhat jagged and core 2 in its outer area to jacket 5 has become more coarse. This is owed to the comparatively hard α+β-brass grains 8 which during the drawing action are variably hard pressing against the softer core 2. The thickness of the α+β-cover layer 6 of jacket 5 is about 16 µm. Otherwise, the structure of the α+β-cover layer 6 is essentially according to the structure discussed in connection with FIGS. 2 and 3. In particular, a homogenous matrix 7 of brass is shown, which is present in its β/β' brass phase 7. In the said homogenous β/β' brass phase 7, α+β-brass grains 8 are embedded. The elongated configuration of the α+β-brass grains 8 was not influenced by the drawing action to the final diameter and neither its radial orientation as described above. The structure as set forth in that connection apply likewise to the embodiment of the wire electrode 10 of the present invention as shown in FIG. 4. Its tensile strength is 800 N/mm².

Figure 5:
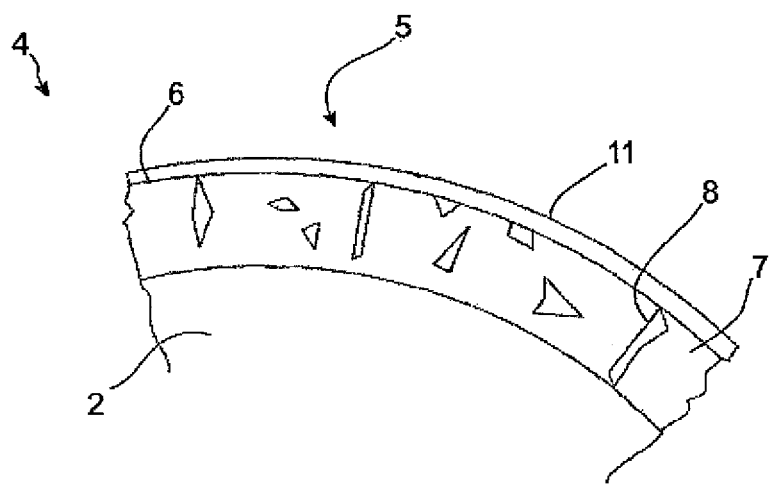
FIG. 5 an embodiment of the wire electrode according to the present invention shortly before completion in a view according to FIG. 3.

FIG. 5 shows a wire electrode 4 according to FIG. 3, which however was galvanically zinc coated, so that an outer zinc layer 11 has been formed, which entirely surrounds core 2 and the α+β cover layer 6. The jacket 5 of the wire electrode 4 comprises now a α+β-cover layer 6 and is surrounded completely by an outer zinc layer 11. The thickness of the zinc layer 11 in the embodiment as shown is about 3 to 4 µm. The wire electrode 4 according to FIG. 5 was thereafter drawn to its final diameter of 0.25 mm. Subsequent thereto, the de-stressing annealing was carried out. Thereby, the hard drawn wire became a hard wire with a tensile strength of about 800 N/mm². The preset temperature for the de-stressing annealing was so low that diffusion processes could be safely avoided. The diffusion annealing serves only, to set the degree of hardness of the wire electrode.

Figure 6:
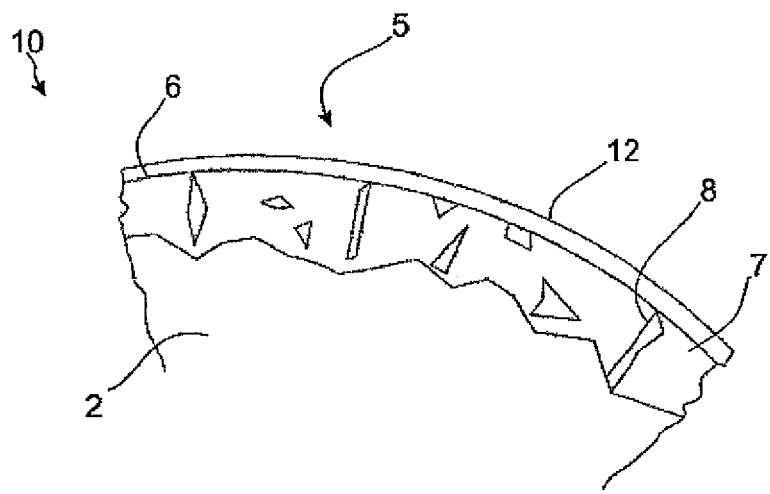
FIG. 6 the wire electrode according to FIG. 5 after drawing to the final diameter and a subsequent de-stressing annealing as a further embodiment of the wire electrode according to the present invention, and FIG. 7 a cross sectional view of an electron microscopic photo showing an embodiment of the wire electrode according to the present invention.

Subsequently, the wire electrode 4 drawn to its final diameter was annealed in a continuous annealing furnace in a protective gas atmosphere comprised of a nitrogen-hydrogen mixture. The annealing temperature was 310° C. The wire electrode was drawn at a speed of 0.6 m/s through the discharge annealing furnace. The residence time of the wire electrode in the heated area of the annealing furnace was about 1 to 2 seconds. The so obtained wire electrode 10 is shown in FIG. 6 as a further embodiment of the wire electrode of the present invention.

As already stated in connection with FIG. 4, the outer profile of core 2 varies from the ideal circular shape in the shown cross sectional view after the wire electrode 10 has been drawn to its final diameter. In FIG. 6 the jagged extension of the surface of core 2 is seen. The structure and configuration of the α+β-cover layer 6 is essentially unchanged so that the respective description in connection with FIG. 4 apply here as well. Thus, the α+β-cover layer 6 consists of homogenous β/β' brass phase 7, that is brass which is present in its β brass or β' brass. In this homogenous β/β' brass phase 7, the α+β-brass grains 8 are embedded. The jacket 5 comprises however now a further second cover 12 which consists of almost homogenous γ-brass. The so obtained wire has a tensile strength of about 800 N/mm².

Figure 7:
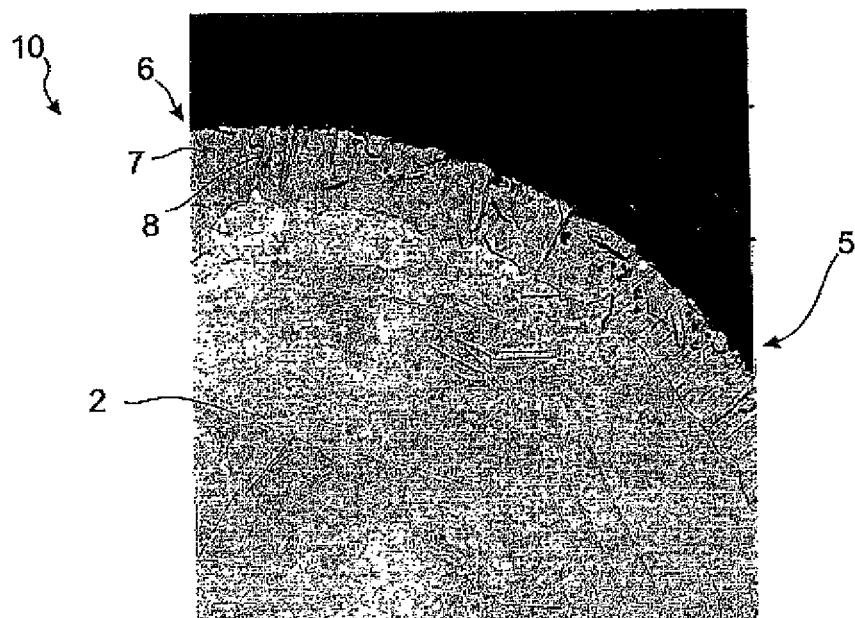

FIG. 7 is a photo of an electron microscopic image of a wire electrode 10 according to the present invention shown exemplary as a transverse ground cut. The typical assembly of the core 2 of α-brass is seen showing the typical α-structure with polygones and twins. Furthermore, the jacket 5 is seen that has a single α+β-cover layer 6. In particular, the homogenous structure of the β/β' brass 7 is seen with the α+β-brass grains 8 embedded therein.

What is claimed is:

1. A wire electrode for spark erosive cutting of articles, comprising,
an electrically conducting core with a core-surrounding casing, said casing provided with at least an α+β-casing layer containing one or more of the elements selected from the group consisting of β brass, β'-brass and α+β'-brass, wherein the α+β-casing layer forms a homogenous phase from β-brass and/or β'-brass, into which α+β-brass grains are embedded, said α+β-brass grains exhibit an α+β and/or a α+β'-phase, wherein the α+β-brass grains are not facing the outer or inner surface of the α+β-casing and are entirely surrounded by the homogenous phase from β-brass and/or β' brass.

2. The wire electrode according to claim 1, wherein the wire electrode has a cross section of circular shape, and wherein the α+β-brass grains are configured elongated and predominantly oriented in a radial direction.

3. The wire electrode according to claim 1, wherein the α+β-casing layer is an outermost casing layer.

4. The wire electrode according to claim 3, wherein the core-surrounding casing consists entirely from the α+β-casing layer.

5. The wire electrode according to claim 1, wherein the core-surrounding casing has a γ-casing layer which predominantly consists of γ-brass.

6. The wire electrode according to claim 5, wherein the γ-casing layer consists entirely of γ-brass.

7. The wire electrode according to claim 5, wherein the γ-casing layer is an outermost casing layer.

8. The wire electrode according to claim 1, wherein an outer core layer of the core bordering the core-surrounding casing consists of copper or α brass and exhibits a cross section with a jagged outer edge.

* * * * *